April 15, 1952     J. M. WALLING     2,592,984
HYDROSTATIC PRESSURE TESTING DEVICE
FOR BOTTLES AND THE LIKE
Filed Aug. 12, 1946     2 SHEETS—SHEET 2
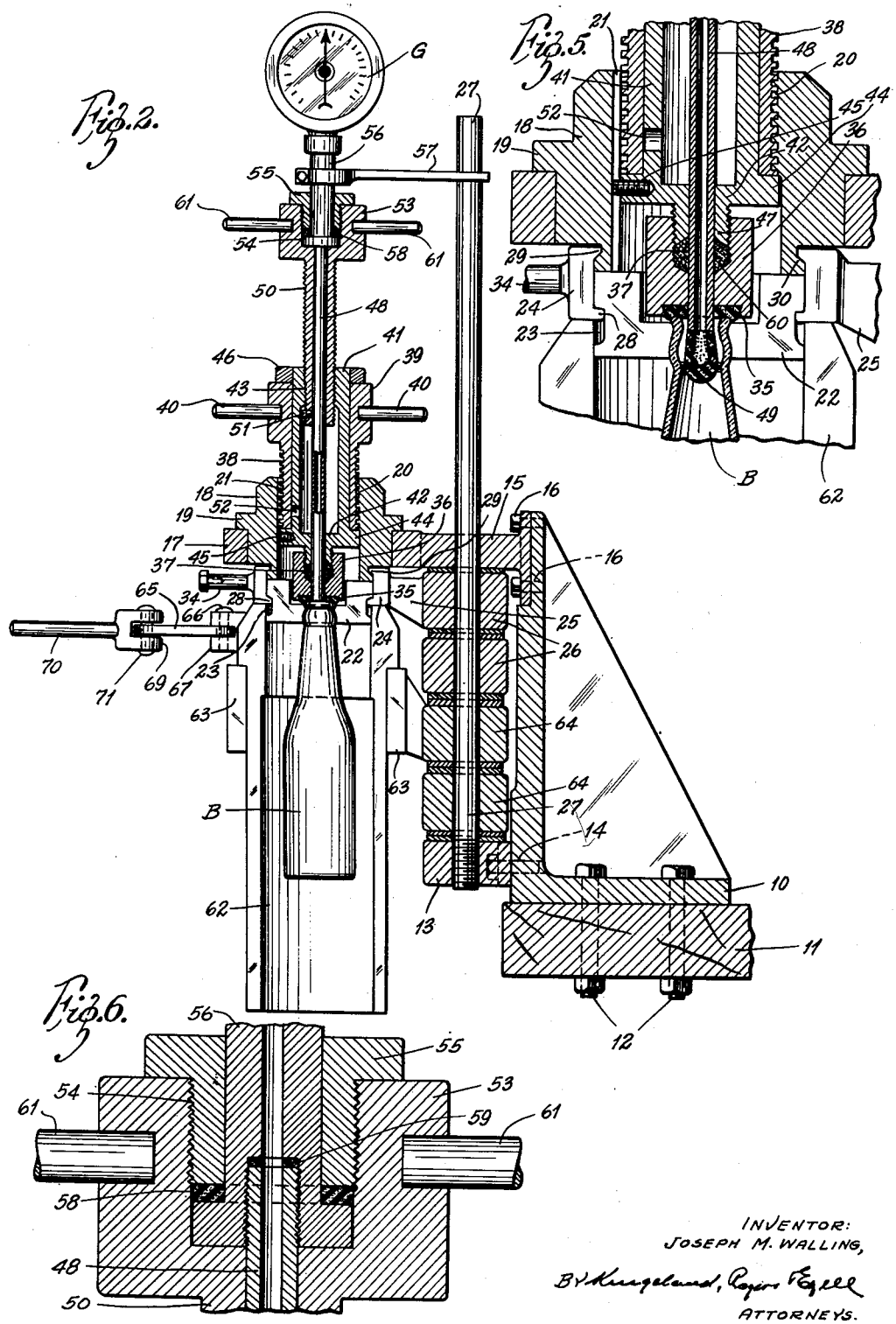
INVENTOR:
JOSEPH M. WALLING,
ATTORNEYS.

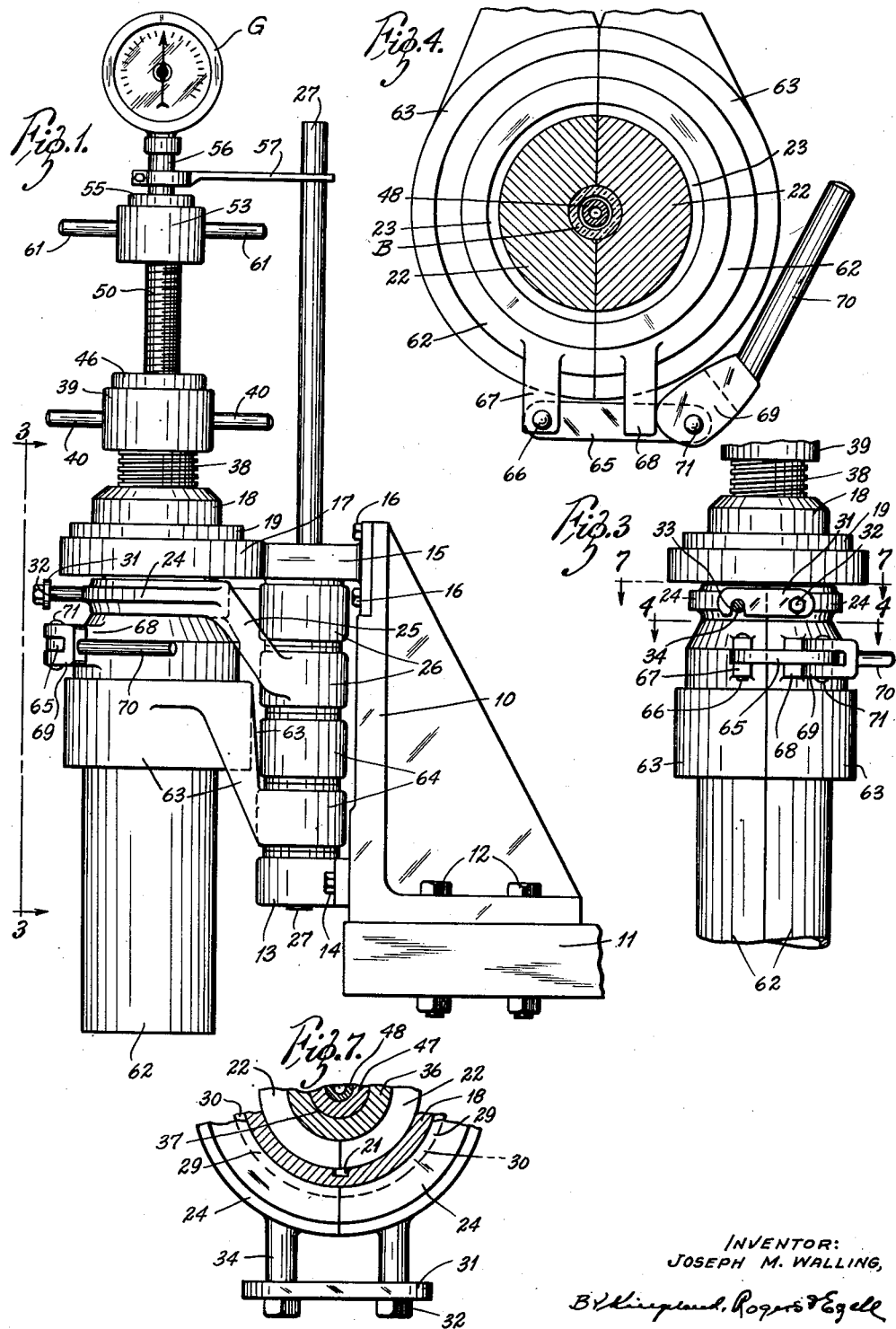

Patented Apr. 15, 1952

2,592,984

UNITED STATES PATENT OFFICE 2,592,984

HYDROSTATIC PRESSURE TESTING DEVICE FOR BOTTLES AND THE LIKE

Joseph Milton Walling, St. Louis, Mo.

Application August 12, 1946, Serial No. 689,934

8 Claims. (Cl. 73—37)

This invention relates to hydrostatic pressure testing devices, and more particularly to a testing device designed for testing the strength of glass containers, such as bottles.

An object of the invention is to provide a device primarily for testing narrow-neck container ware of different sizes in order to determine the maximum wall strength, comprising selected means for holding the bottles and for mechanically impressing a hydrostatic pressure upon the liquid contained in the bottle, and measuring the maximum pressure, by gauge, of the internal pressure that the bottle withstands at the breaking point.

Several additional novel structural features of the construction will appear from the following detailed description taken in connection with the accompanying drawings, in which:

Fig. 1 is a side elevation of the device mounted on a permanent support;

Fig. 2 is a vertical section through a part of the mechanism, and showing the guard for the bottle in open adjustment;

Fig. 3 is a front elevation, viewing the structure on the line 3—3 of Fig. 1;

Fig. 4 is a horizontal section taken substantially on the line 4—4 of Fig. 3;

Fig. 5 is an enlarged sectional view to further illustrate details of the support for the bottle, the method of sealing, and the positioning of the hydrostatic tube in the mouth of the bottle;

Fig. 6 is an enlarged sectional view, particularly showing a part of the carrier for the movement of the hydrostatic tube; and Fig. 7 is a horizontal sectional view substantially on the line 7—7 of Fig. 3.

In the embodiment of the invention selected for illustration, the device is shown as including an L-shaped bracket 10, the base of which may be clamped to a permanent support 11, such as a bench or table, and securely attached thereto by bolts 12 passing through the base of the bracket.

A threaded socket member in the form of a threaded metal piece 13 is secured to the outer vertical face of the bracket 10 by bolts 14. Near the top of the vertical face of the bracket 10 is a flanged arm 15, likewise secured to the outer vertical face of the bracket 10 by bolts 16, the rear face of the flange portion of the member 15 seating in a recess, as clearly indicated in Figs. 1 and 2. The outer end of the arm 15 has formed in integral connection therewith a ring member 17, which supports in rigid connection therewith a sleeve 18 having an annular flange 19 that fits over the top face of the ring member 17. The member 18 has an internally threaded bore 20, and is provided with a vertical slot 21 formed in one wall thereof.

The support for the bottle B to be tested comprises a split neck ring including two segments 22, contoured to fit the neck of the particular bottle being tested. Since the contours and dimensions of bottles of varying sizes are different, it will be understood that an appropriate neck ring closely fitting the neck of the particular bottle to be tested is used. The two segments of the neck ring are placed so as to surround the outer surface of the bottle at the top, as best shown in Fig. 5 of the drawings.

The outer perimeter of each segment of the neck ring 22 has a recess 23 formed in the wall thereof, and a retaining strap comprising a split-ring band formed from segmental members 24 fits around and clamps the neck ring in place. The segments 24 are carried by arms 25, which are supported to be oppositely opened and closed. The hinge mounting for said arms comprising hinge knuckles 26 are mounted on a hinge pin 27. The hinge pin 27 extends through an axial opening in the arm 15 and seats in a threaded socket in the member 13. This construction forms an H hinge support for the ring segments and permits the segments 24 to open and close about the bottle supporting neck ring.

It will be noted that the members 24 are each provided with a segmental flange 28 near the bottom thereof, and a segmental flange 29 near the top thereof, the underface of the flange 29 being bevelled inwardly. Near the lower portion of the member 18 is a recess or shoulder 30, having walls complementary to the walls of the flange 29 so that, when the ring segments 24 are closed, the upper face of the flange 28 will bear against the underface of the upper surface of the wall of the recess 23, and the flange 29 will seat into the recess 23, securely holding the neck ring segments 22 about the neck of the bottle.

In order to retain the segments of the supporting ring in latched engagement, a latch lever 31 is secured at one end to a pivot screw 32 secured into one of the members 24 near the free end thereof, and a notch 33 in the latch lever 31 fits over a pin 34 carried by the other of the members 24. Thus, when the two ring members 24 are closed together, the ring is securely latched to hold the neck ring about the neck portion of the bottle, and to support said bottle securely, in a depending position from the neck ring.

In order to seal the top of the bottle, a gasket 35 of rubber, or other suitable material, is seated in a recess in the lower wall of a block member 36, which block member has an opening 37 therethrough, the upper part of which is internally threaded and the lower part of which is of reduced diameter, as shown in Figs. 2 and 5.

An externally threaded hollow sleeve 38 threads into the threaded bore 20 of the member 18. Above the threaded section of the sleeve 38, the external wall of the sleeve is enlarged forming a head 39, the lower face of which overhangs the threaded portion of the sleeve. A pair of axially aligned pins 40 are connected into the periphery of the head 39 and form engaging means for manually rotating the sleeve 38 to raise and lower it in respect of the member 18.

A second sleeve 41 of reduced diameter is fitted within the bore of the sleeve 38, said sleeve 41 being closed at its lower end by a bottom wall 42 and having a threaded section 43 at the throat of the upper end of the bore in the sleeve. The bottom wall 42 is extended to form an annular flange 44 that overlies the lower end of the sleeve 38. A pin 45 extends outwardly from the edge of the flange 44, the outer extremity of said pin 45 being seated in and being adapted to ride in the slot 21. The sleeve 41 also has surrounding its upper edge an annular ring 46, which overlies and bears against the upper face of the head section 39 of the sleeve 38, so that the sleeve 38 is held rigidly in connection with the sleeve 41, the two members being raised and lowered together as the sleeve 38 is rotated. The pin 45, operating in the slot 21, prevents the two sleeves 38 and 41 from relative circumferential movement while the two members are being raised and lowered by manipulation of the sleeve 38.

A threaded cylindrical extension 47 extends downwardly from the underface of the wall 42, and threads into the threaded upper section of the bore 37 of the block member 36, so that, when the sleeve 38 is screwed down, the block member 36 will move with it, pressing the gasket 35 into close contact with the upper edge of the bottle neck.

After the bottle has been mounted and sealed, a tube 48, filled with water or another liquid and provided at its lower end with a flexible bulb or diaphragm 49, is arranged to be lowered into the neck of the bottle in such a manner as to translate the hydrostatic pressure resulting from displacement of the liquid contained in the bottle B.

The tube 48 is mounted in a carrier, which comprises a threaded cylindrical sleeve 50, which threads into the threaded portion 43 of the sleeve 41. The tube 48 is held rigidly with the sleeve 50 by a lock screw 51 positioned and removed through an opening 52 in the side wall of said sleeve 41. The upper end of the sleeve 50 is enlarged to form a head 53. A recess 54 is formed in the upper face of the head and a flanged thrust bearing member 55 is threaded therein.

At the upper extremity of the tube 48 is a gauge G to register pressure transmitted thereto through the tube 48 from the internal hydrostatic pressure within the bottle through the bulb 49.

The gauge device G is supported above the end of the tube in such a manner that the gauge moves vertically with the tube 48.

At the bottom of the gauge is a hollow stem 56, the bore of which has an enlarged lower portion and which stem connects into the housing of the gauge proper, the stem being supported by a clevis arm 57 that rides on the pin 27.

The upper end of the tube 48 seats in the enlarged lower part of the bore of the stem 56. The lower end of the stem 56 is formed with an enlarged annular flange, and a wear washer 58 is interposed between the top face of the flange and the lower face of the member 56.

A washer 59 is seated between the top edge of the tube 48 against the shoulder formed between the enlarged and reduced portions of the bore of the stem 56, thereby sealing the connection between the tube and the stem.

By reference to the drawings, particularly Figs. 2 and 5, it will be noted that the tube 48, in its lower section, passes through an opening in the wall 42 and its extension 47, through the opening 37 in the block member 36, and through an opening in the sealing gasket 35.

The bore, through which the tube 48 enters the neck of the bottle, and the exterior wall of the tube 48 are further sealed by packing 60 seated in the bottom of the threaded portion of the opening 37 and rests on the shoulder formed by the reduced lower portion of the bore, and with the member 47. This provides a packing gland.

This provision is made in order that the interior of the bottle, when being tested, remains air sealed, so that all of the hydrostatic pressure will be impressed against the bulb 49 as the intruded end of the tube 48 is moved downwardly into the bottle B.

In order to provide for easy manipulation of the carrier for the tube 48, axially aligned pins 61 are connected into the periphery of the head 53 of the tube 48.

From the description of the structure thus far given, it will be understood that the device is one that may be easily operated for the testing of the wall strength of different types of bottles.

As has been explained, the appropriate neck ring for a specific type of bottle is selected and clamped in place to hold the bottle suspended below the tube 48. The lower sleeve assembly is then screwed down so that the gasket 35 closes and seals the top of the bottle, it being understood that the bottle is filled with liquid before being mounted in place. The tube 48 is then forced downwardly by rotation of the head 53, forcing the bulb 49 progressively deeper into the liquid in the bottle. As the tube 48 descends into the bottle, the hydrostatic pressure is increased until the wall of the bottle fractures, and, since the pressure on the bulb is coordinated with the pressure exerted against the interior walls of the bottle, an accurate reading of pounds per square inch, or in other units, will register on the gauge G. By observation, the fracture point may be thus ascertained for the different bottles tested.

Inasmuch as the internal radial pressure against the walls of the bottle will be relatively high when the bottle fractures, it will obviously scatter the fragments, and, in order to protect the operator, a shield in the form of hinged segments 62 is provided, which segments are supported, respectively, on hinge straps 63 carried by hinged knuckles 64 mounted on the common hinge pin 27.

After the bottle has been mounted for testing, and before pressure is impressed on the liquid contained in the bottle, the guard segments 62 are closed and are locked in position by a releasable lock device comprising a hinged lever 65, pivoted on a hinge pin 66 carried by a lug 67 extending from the outer face of one of the segments 62. The other end of the lever 65 passes between the arms of a bifurcated lug 68 and a cam lever 69 having a handle 70 which is pivotally attached at 71 to the other end of the locking lever 65. This lock structure draws the segments together and serves to hold them in a locked position, as clearly illustrated in Fig. 4, when the handle 70 is moved inwardly. To open the guard segments by moving the handle outwardly, the latch device is quickly released and the segments may then be moved apart so that the bottle may be accessible.

From the foregoing description, it will be understood that I have provided a testing device, which may be conveniently and easily operated, and which is effective to give accurate fracture readings for bottles to be tested.

While I have illustrated and described the invention as particularly applicable to narrow-neck container ware, it will be understood that by modifications within the invention, it may be adapted for testing of other articles having the same general characteristics as bottles. I do not wish it understood that I am limited as to details as illustrated and described, except as specifically claimed.

What is claimed is:

1. In a device of the kind described, the combination of a holder for a hollow container to be tested, including a neck ring contoured to fit the neck of a container being tested, a sealing member for fitting over the opening of a container, means for exerting pressure on said sealing member, a tube adapted to pass through said sealing means and enter the opening of a container, a pressure responsive member in sealed relation with the intruding end of said tube, means for moving said tube vertically in respect of a container, and a gauge device in connection with said tube for registering pressure in said tube impressed thereon by distortion of said pressure responsive member.

2. In a device of the kind described, the combination of a holder for a hollow container to be tested, a sealing member fitting the opening of a container, means for positioning and holding said member in sealing relation with an opening, a tube adapted to pass through said sealing member and into a container, a pressure responsive flexible member in sealed relation with the intruding end of said tube, means for moving said tube in opposition to pressure of liquid in a container, and a gauge device connected with said tube for registering pressure in said tube impressed thereon by distortion of said pressure responsive member.

3. In a device of the kind described, the combination of a holder for a hollow container to be tested, including a removable and replaceable neck ring, a support for said neck ring, a sealing gasket fitting the opening of a container, a tube adapted to pass through said sealing means and enter the opening of a container, a pressure responsive member in sealed relation with the intruding end of said tube, means for moving said tube vertically in respect of a container, and a gauge device in connection with said tube for registering pressure in said tube impressed thereon by distortion of said pressure responsive member.

4. In a device for testing the resistance of the walls of a hollow frangible container to internal pressure of fluid contained therein, the combination of means for supporting a container comprising a removable neck ring and a support therefor, means for sealing an opening of the container including a vertically movable first carrier and mechanical means for moving said first carrier, a tube passing through said sealing means and movable vertically with respect to the opening of a container, a pressure responsive member sealing the intruded end of said tube, a pressure gauge cooperatively related with the opposite end of said tube constructed to respond to pressure in said tube, and means for reciprocating said tube into and out of the opening in a container including a second carrier for said tube and manually manipulative means for operating said second carrier.

5. In a device for testing the resistance of the walls of a hollow frangible container to internal pressure of fluid contained therein, the combination of means for supporting a container, means for sealing the opening of a container, a tube passing through said sealing means and movable vertically with respect to the opening of a container, a pressure responsive member sealing the intruded end of said tube, a pressure gauge connected with the opposite end of said tube to respond to pressure in said tube, and a pair of hinged segments constructed to open and close around a container when mounted in its support.

6. In a device for testing the resistance of the walls of a hollow frangible container to internal pressure of fluid contained therein, the combination of means for supporting a container, means for sealing the opening of a container, means for forcing said sealing means into sealing relation with a container opening, a tube passing through said sealing means and movable vertically with respect to the opening of a container, a pressure responsive member sealing the intruded end of said tube, a pressure gauge connected with the opposite end of said tube to respond to pressure in said tube, and mechanical means for reciprocating said tube into and out of the opening in a container.

7. In a device of the kind described, a holder for a liquid filled container to be tested, means for sealing the opening of a container supported in said holder, a tube having a pressure responsive member in sealed relation with one end thereof, said tube containing a liquid, pressure measuring means connected to the other end of said tube, the sealing means containing an aperture to receive said tube, and means for inserting the pressure responsive end of said tube through said aperture and into a container supported in said holder.

8. In a device of the kind described, a holder for a liquid filled container to be tested, means for sealing the opening of a container supported in said holder, a tube having an elastic bulb in sealed relation with one end thereof, said tube containing a liquid, a pressure gauge connected to the other end of said tube to indicate the pressure in said bulb, the sealing means containing an aperture to receive said tube, and means for inserting said bulb through said aperture and into the liquid of a container supported in said holder to cause the container to fracture.

JOSEPH MILTON WALLING.

REFERENCES CITED

The following references are of record in the file of this patent:

UNITED STATES PATENTS

| Number | Name | Date |
| --- | --- | --- |
| 2,048,027 | Preston | July 1, 1936 |
| 2,314,310 | Jackson et al. | Mar. 16, 1943 |